May 26, 1970  F. MORESI  3,514,654

MINIATURE ELECTRIC MOTOR

Filed Jan. 30, 1968  2 Sheets-Sheet 1

INVENTOR
FRANCO MORESI

BY Emory L. Groff

ATTORNEY

May 26, 1970 F. MORESI 3,514,654
MINIATURE ELECTRIC MOTOR
Filed Jan. 30, 1968 2 Sheets-Sheet 2

INVENTOR
FRANCO MORESI
BY Emory L. Groff
ATTORNEY

United States Patent Office 3,514,654
Patented May 26, 1970

3,514,654
MINIATURE ELECTRIC MOTOR
Franco Moresi, Lausanne, Switzerland, assignor to S. A. Paillard, Vaud, Switzerland, a company of Switzerland
Filed Jan. 30, 1968, Ser. No. 701,695
Claims priority, application Switzerland, Feb. 17, 1967, 2,337/67
Int. Cl. H02k 1/22, 13/04, 21/00
U.S. Cl. 310—266                                                7 Claims

ABSTRACT OF THE DISCLOSURE

A miniature motor wherein a bell-shaped rotor without an iron core is provided at one end with two commutator systems each including conductive elements corresponding to the strips of the corresponding commutator. The conductive elements are insulatingly carried in substantially radial relationship by the same or by the surface of a disc rigid with the rotor shaft, said elements also being connected with the windings embedded in the rotor body which is made of synthetic material.

---

Miniature electric motors conventionally incorporate a rotor without an iron core and comprise a bell-shaped support of synthetic material in which the winding is embedded. The magnetic field is supplied by a stationary permanent magnet, generally housed inside the rotor, said magnetic circuit being closed by a ferromagnetic sleeve surrounding said rotor.

Electric motors are also known, which are provided with two windings and two commutators, which are somewhat similar to the commuating motors which supply a high voltage when fed by a low voltage supply.

It would be advantageous in certain applications of miniature electric motors to employ motors provided with two windings, but hitherto this has not been possible since the manufacture of motors wherein the bell-shaped rotor does not contain iron does not permit the insertion of a commutator at each end of the rotor and the use of a double commutator at one end only of the rotor leads to insuperable difficulties.

The object of the present invention is to overcome the disadvantages of the prior art and is directed to improvements in electric motors of the double winding type, wherein the two windings are connected with the corresponding commutators, located in the same end of the rotor. According to the present invention and with a view to providing a miniature motor wherein the bell-shaped rotor does not include an iron core, there is fitted on the rotor shaft a washer of insulating material the opposite surfaces of which are each provided each with conductive elements extending from the center thereof towards its periphery, the number of conductive elements on each surface being equal to the number of commutator strips.

Figure 1:
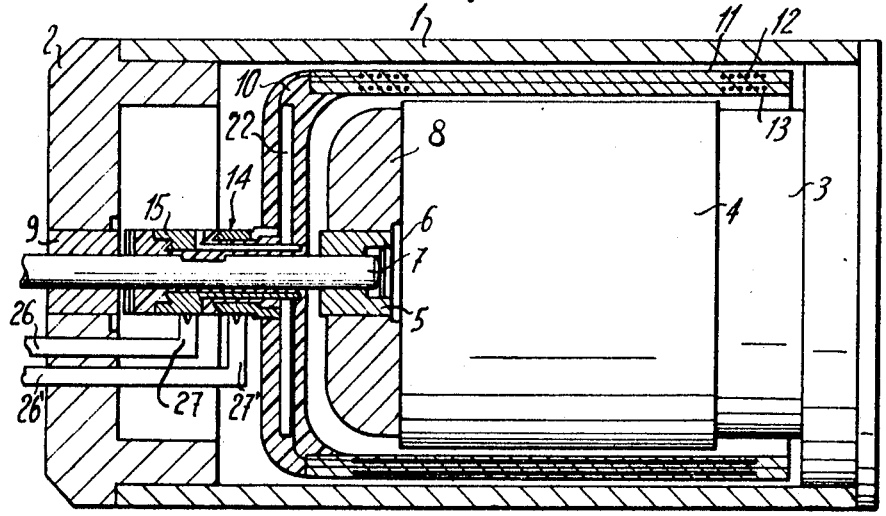
Figure 2:
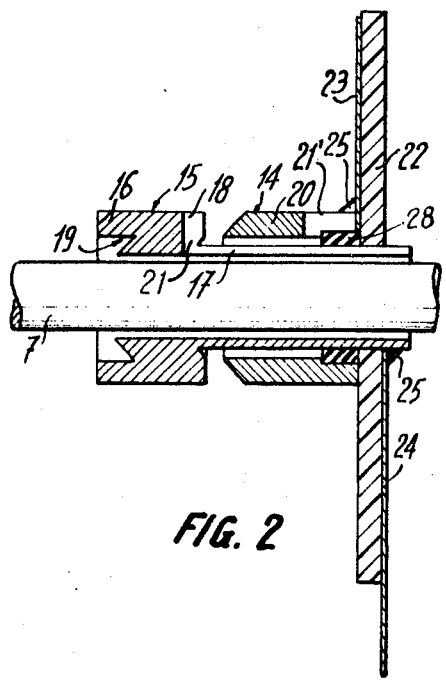
Figure 3:
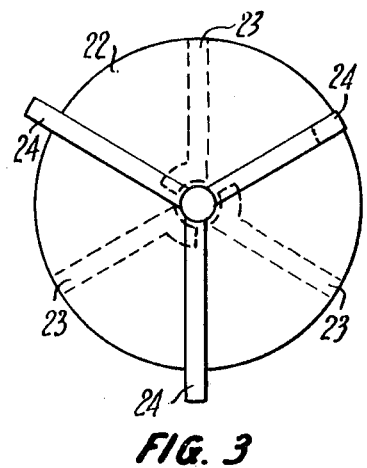
Figure 4:
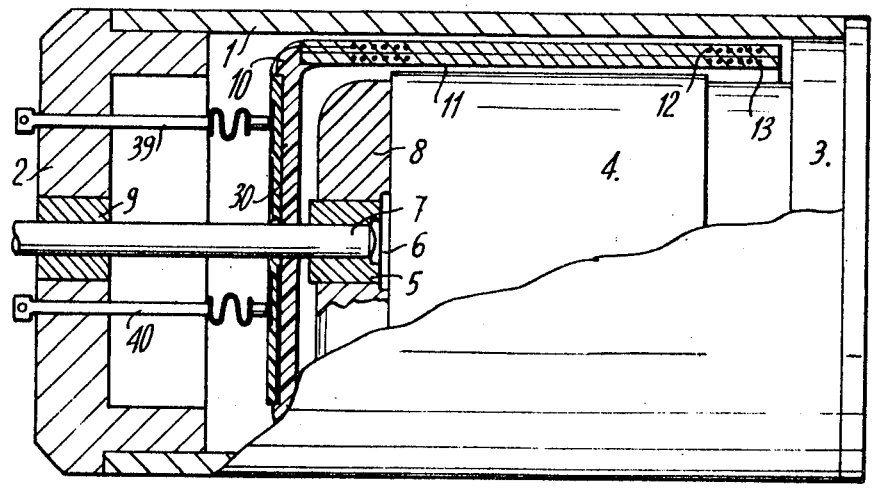
Figure 5:
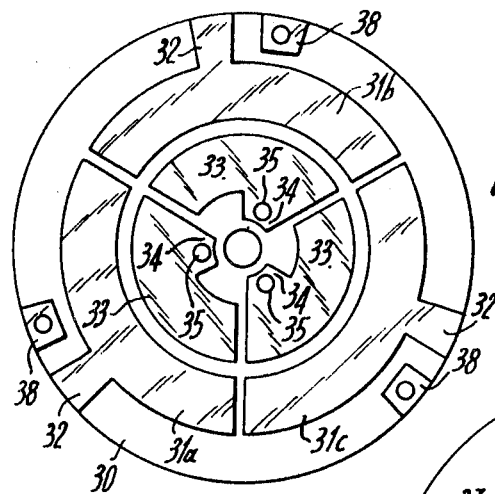
Figure 6:
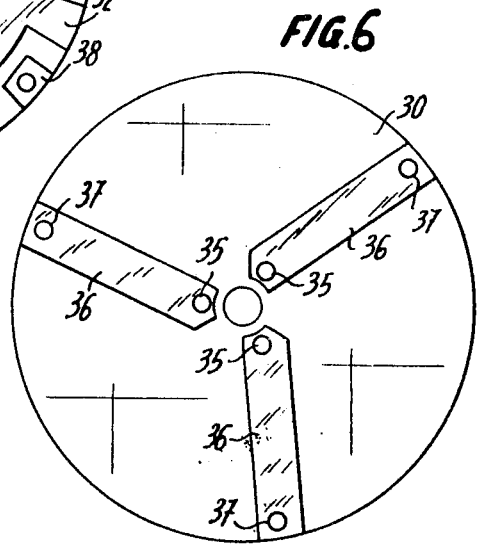

The accompanying drawings illustrate diagrammatically and by way of example two embodiments of a miniature motor according to the invention. In said drawings:

FIG. 1 is an axial cross section of the first embodiment.
FIG. 2 illustrates on a larger scale a detail of FIG. 1.
FIG. 3 is a view of a washer forming part of the motor illustrated in FIG. 1.
FIG. 4 is a longitudinal view partly in section of the second embodiment.
FIG. 5 is a front view of the commutator comprising a disc which forms part of said second embodiment.
FIG. 6 is a rear view of the disc shown in FIG. 5.

The motor illustrated in FIG. 1 includes a casing comprising a recessed cylindrical body 1 closed at its ends by flanges shown at 2 and 3 respectively. A permanent magnet 4 in the form of a solid cylinder is adhesively secured to the flange 3 along one of its terminal surfaces. Its opposite terminal surface carries a disc 6 on which is mounted a bushing 5 of self-lubricating sintered bronze which provides an axial thrust bearing for a shaft 7. The bushing 5 and disc 6 are embedded within a plastic body 8 adhesively secured to the surface of the magnet 4 opposite the flange 3.

The shaft 7 is revolvably carried inside a further bushing 9 inserted in the flange 2. Said shaft 7 carries a bell-shaped rotor 10 including a synthetic resin skirt 11 disposed in the space between the magnet 4 and the inner cylindrical periphery of the casing. Inside the synthetic resin forming the skirt are embedded the windings 12 and 13 each forming an arcuate compact winding corresponding to the shape of said skirt 11. The windings 12 and 13 are each connected each with a corresponding commutator designated generally as 14 and 15 carried by a washer 22 to be described hereinafter. Of course, each of the commutators includes a number of strips which is equal to the number of coils forming the corresponding windings 12 or 13.

FIG. 2 illustrates in cross section, on a larger scale, the double commutator in the process of manufacture. In the illustrated embodiment where the commutators each include three lead strips or segments, the commutator 15 comprises a sleeve 16, provided on the side facing the washer 22, with a section 17 of a reduced diameter in which three longitudinal slots 21 are cut between the outer end of the reduced diameter section and the point 18 of the sleeve, the end of which remains transiently uncut. Furthermore, said sleeve 16 is provided with an annular inner groove 19 at its end opposite to the reduced diameter section, said annular groove 19 allowing insulating resin to adhere to the sleeve during molding. The synthetic resin then forms a block ensuring a rigid connection between the commutator 15, its sleeve 16 and the shaft 7. The reduced diameter section 17 of the sleeve 16 extends inside the other commutator 14 including a second sleeve 20 in which three longitudinal slots 21' are provided so as to form three separate angularly distributed leads along the part of the sleeve adjacent the washer 22.

The reduced diameter section 17 is separated from the sleeve 20 by an insulating ring 28.

The free end of the smaller diameter section 17 extends through the central opening in the washer 22 made of insulating material and carries on each of its opposite surfaces, as illustrated in FIG. 3, conductive elements 23 and 24, respectively, each adapted to be connected by corresponding welding points 25 with the corresponding strips of the commutators 14 and 15. To this end, the conductive elements 23 on one surface of the washer are welded to the three angularly distributed leads of the sleeve 20 which are separated from each other by the three slots 21. The three conductive elements 24 carried by the other surface of the washer 22 are electrically connected with the three leads formed by the subdivision of the reduced diameter section 17 of the sleeve 16. When the welds 25 have been completed, the shaft 7, the sleeves 16 and 20 and the washer 22 are set inside a mold which ensures their accurate positioning with reference to each other, the casting of insulating resin adapted to be polymerized inside the mold then secures all said parts together.

When the resin has set, the annular terminal uncut sections of the sleeves 16 and 20 are slotted along the same planes as the slots 21, 21', so as to form the different commutator strips at the ends of the leads formed between said slots.

As illustrated in FIG. 3, the elements 23 and 24 project slightly beyond the periphery of the washer 22 which facilitates producing the welds connecting said strips with the coils forming the windings 12 and 13. Said coils are set inside a mold which also encloses the inner end of the shaft 7. As soon as the electric connections have been completed between the coils and the corresponding conductive elements 23 and 24, the mold permits the casting of a resin adapted to be polymerized and embedding of the windings together with the washer 22 carrying both commutators.

The ends of the leads 26, 26' passing through the flange 2 (FIG. 1) which is made of insulating material are connected with brushes 27, 27' adapted to cooperate, as well-known in the art, with the corresponding commutators 14 and 15.

In the embodiment illustrated in FIGS. 4 and 6, the commutator is constituted by a disc 30 of insulating material the opposite surfaces of which carry metal deposits, for example of copper, which may be obtained by the well-known method used for printed circuits. The deposits on the surface illustrated in FIG. 5 form two groups of three arcuate strips extending along two coaxial circles. The outer group includes three sections 31 forming the three strips of a commutator. The reference numbers of said sections are associated with the letters $a$, $b$ and $c$ in the drawings, so as to distinguish the different strips of the commuator formed by them. Each section 31 includes a part 32 extending up to the periphery of the disc 30.

Inside the circle formed by the sections 31 are formed three other metal deposits forming the inner group of three strips 33. Each of said sections 33 includes an extension 34 directed towards the center of the disc 30, said extension being provided with a hole 35 opening into the opposite surface of the disc 30. Said hole 35 carries a rivet ensuring the electric connection between the corresponding strips 33 and a radial strip 36 carried by said opposite surface of the disc 30. The end of each strip 36 adjacent the periphery of the disc 30 is also provided with a hole 37 through which a rivet connects the strip 36 with a metallized section 38 extending over the first-mentioned surface of the disc 30.

Consequently, the two commutators comprise coaxial groups of arcuate coaxial strips lying on the same surface of the disc 30 as that illustrated in FIG. 5, while the points connecting the commutator strips with the coils comprise the sections 32 and 38 respectively all located along the periphery of the same side of the disc 30.

I claim:

1. A miniature electric motor comprising a stationary magnetic circuit including a permanent magnet and a casing enclosing said magnet with a gap therebetween, a bell-shaped rotor of synthetic material including armature coils, the skirt of said rotor disposed within said gap, a shaft coaxially rigid with said rotor, two separate commutators each including commutator segments, a series of conductive connection elements between the commutator segments of each commutator and said coils, an insulating disc rigid with said shaft, and electrically fed brushes engaging said commutators, wherein the connection elements of one series are carried by one face of said disc, while the connection elements of the other series are at least partially located on the opposite face of said disc.

2. A miniature electric motor as claimed in claim 1 wherein said conductive connection elements in each series extend at least to within the immediate vicinity of the perimeter of said disc.

3. A miniature electric motor as claimed in claim 1, wherein a series of conductive connection elements carried by one side of the disc is operatively connected with a further series of conductive elements carried by the opposite side thereof.

4. A miniature electric motor as claimed in claim 1, wherein the conductive connection elements of a series carried by one side of the disc have extensions overlapping the edge of the disc and ending on the opposite side of the disc.

5. A miniature electric motor as claimed in claim 1, wherein both series of conductive connection elements are carried by one side of the disc and form the strips of the corresponding commutators.

6. A miniature electric motor comprising a stationary magnetic circuit including a permanent magnet and a casing enclosing said magnet with a gap therebetween, a bell-shaped rotor of synthetic material including armature coils, the skirt of said rotor disposed within said gap, a shaft coaxially rigid with said rotor, an insulating disc rigid with said shaft, two separate commutators connected with said coils, each commutator including a series of conductive elements insulated from each other and carried by said disc, electrically fed brushes engaging said series of commutators, each of said series of conductive elements carried by the same side of the disc and comprising the strips of the corresponding commutators, the elements of one of the two series of conductive elements extending up to the periphery of the disc, a further series of conductive elements carried by the other side of the disc and extending up to the periphery of the disc and means electrically connecting each element of the further series with a corresponding element of the other series of the first-mentioned two series.

7. A miniature electric motor comprising a stationary magnetic circuit including a permanent magnet and a casing enclosing said magnet with a gap therebetween, a bell-shaped rotor of synthetic material including armature coils, the skirt of said rotor disposed within said gap, a shaft coaxially rigid with said rotor, an insulating disc rigid with said shaft, two sepaarte commutators connected with said coils, each commutator including a series of conductive elements insulated from each other and carried by said disc, electrically fed brushes engaging said series of commutators, each of said series of conductive elements carried by the same side of the disc and comprising the strips of the corresponding commutators, the elements of one of the two series of conductive elements extending up to the periphery of said disc, a further series of conductive elements carried by the other side of the disc, means electrically connecting each element of the further series with a corresponding element of the other series of the first-mentioned two series, and auxiliary conductive sections each electrically connected with a conductive element of said further series and carried by the same side of the disc along the periphery thereof.

References Cited

UNITED STATES PATENTS

| 2,944,169 | 7/1960 | Schmidt. | |
|---|---|---|---|
| 3,290,528 | 12/1966 | Adler | 310—154 |
| 3,308,319 | 3/1967 | Faulhaber | 310—154 |

FOREIGN PATENTS

| 973,746 | 5/1960 | Germany. |

MILTON O. HIRSHFIELD, Primary Examiner

R. SKUDY, Assistant Examiner

U.S. Cl. X.R.

310—67, 136, 154, 237